(No Model.)
T. B. HUSSEY.
HARROW.
No. 346,372. Patented July 27, 1886.
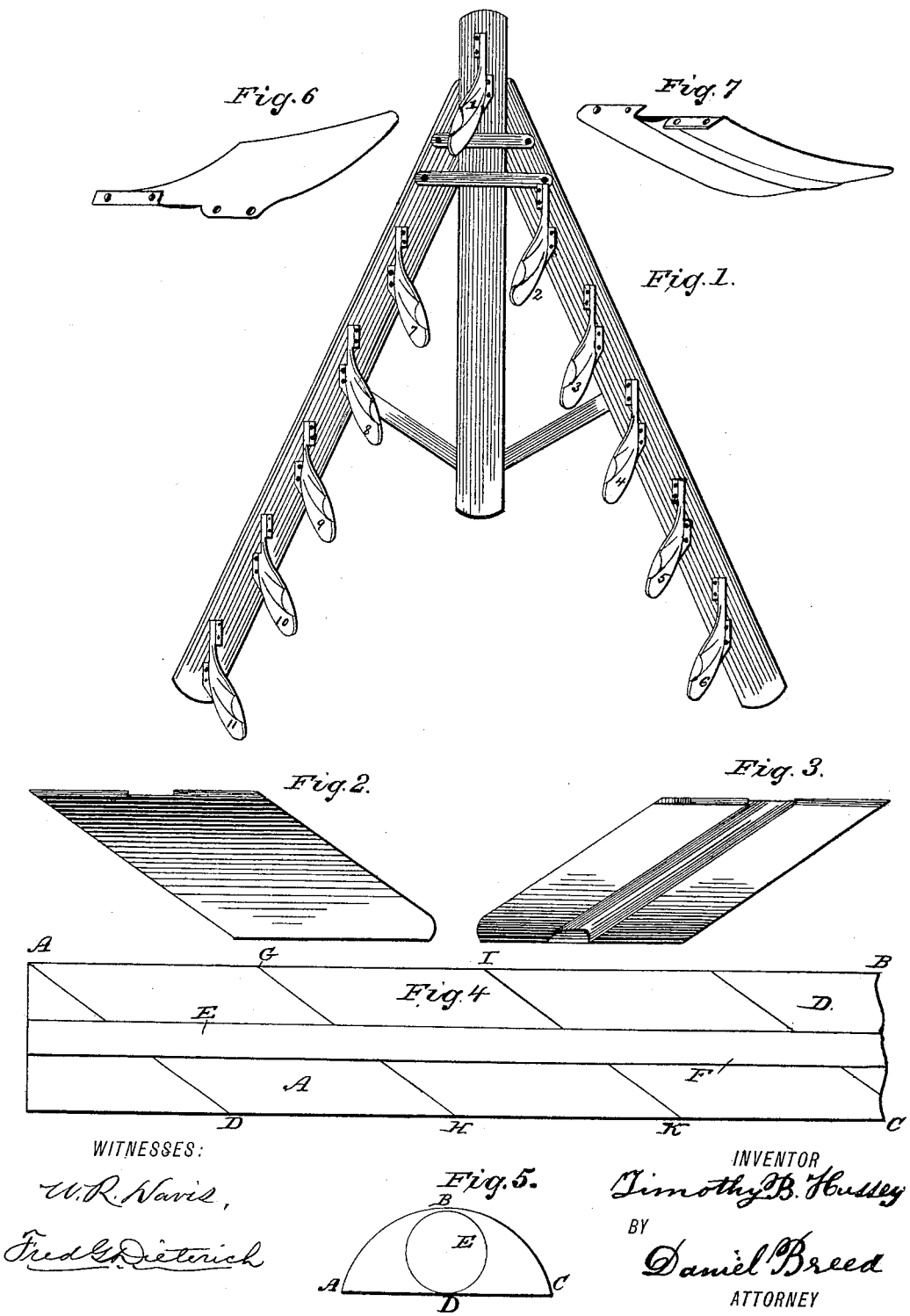
WITNESSES:
W. R. Navis,
Fred G. Dieterich
INVENTOR
Timothy B. Hussey
BY
Daniel Breed
ATTORNEY

UNITED STATES PATENT OFFICE.

TIMOTHY B. HUSSEY, OF NORTH BERWICK, MAINE.

HARROW.

SPECIFICATION forming part of Letters Patent No. 346,372, dated July 27, 1886.

Application filed March 27, 1886. Serial No. 196,831. (No model.)

*To all whom it may concern:*

Be it known that I, TIMOTHY B. HUSSEY, a citizen of the United States, residing at North Berwick, in the county of York, State of Maine, have invented certain new and useful Improvements in Harrows, of which the following is a specification, reference being had therein to the accompanying drawings.

My invention relates to that class of harrows which have broad mold-board-like teeth; and it consists of a harrow-tooth made in the shape of a rhomboid, (usually of sheet metal,) the curve of the tooth being bent over a cycloid.

In the accompanying drawings, Figure 1 is a bottom view of an A-shaped harrow-frame with my rhomboidal teeth thereon. Fig. 2 represents the front or working side of my improved harrow-tooth. Fig. 3 shows the reverse side of the same. Fig. 4 represents the plate from which my harrow-teeth are usually cut. Fig. 5 shows the geometrical figure, illustrating the arc of a cycloid and curve of my harrow-teeth; and Figs. 6 and 7 are photographic views of the tooth.

In the construction of my harrow I propose to use more or less teeth, as may be desired, according to the size of the harrow; but for an ordinary harrow I prefer to use eleven teeth, as shown in Fig. 1, which has a central tooth, 1, followed by two series of teeth on the wings of the frame, both turning their furrows toward the median line of the harrow-frame. Tooth 2 is set farther ahead than tooth 7, so that they never clog by catching a turf between the two, and no two teeth travel abreast. The teeth in each series are set about one foot apart from the point of one tooth to the point of the next tooth following in the same series, and the teeth work the whole ground in the track of the harrow. One tooth opens a little furrow and the next tooth fills the same. When the harrow is weighted, the dirt in part falls over the tooth, which thus nearly fills its own furrow, the curve in the tooth lifting and pulverizing the ground.

This harrow is especially adapted to newly-plowed or sod ground, as it does not catch the turf and turn back the furrows, but works with a scraping-cut, and thoroughly pulverizes the ground.

In making my harrow-teeth I prefer to cut them from a strip of sheet metal, (represented in Fig. 4,) the same being rolled with a stiffening rib or flange thereon, as shown at the line E F. The whole strip of sheet-steel is represented by the letters A B C D, Fig. 4, and the letters A G H D represent a tooth, and the letters G H K I represent another tooth as they are to be cut. The line A D represents the upper end of the first tooth, and the line G H the upper end of the second. The angle D A G is about thirty-five degrees, and hence when these flanges are turned down on this upper end, and the tooth is bolted to the frame, the front or cutting edge, A G, stands at an angle of thirty-five degrees with the horizon. The tooth is also so bolted to the frame that it stands at an angle with the line of draft, so as to bring the stiffening-rib on the back side of the tooth without obstructing the draft or cutting properties of the tooth. The curve of the tooth is bent over the arc of a cycloid, as illustrated by Fig. 5, where the arc A B C represents the cycloid generated by the circle E.

The arc A B represents the form over which the teeth are bent.

I shape the tooth in such manner that if the inverted arc of a cycloid be so applied to the surface of the tooth that the plane of the arc may be parallel to the cutting-edge of the tooth, this arc will coincide with the surface of the tooth.

I do not broadly claim a stiffening-rib upon a harrow-tooth or the curvature of a cycloidal arc, but limit my invention to the construction of harrow-tooth as described.

Having described my invention, I claim—

A rhomboidal-shaped harrow-tooth having inclined and parallel front and rear edges, and parallel horizontal upper and lower edges, the upper edge having opposite-projecting flanges, said tooth having a stiffening-rib on its back, the same being rolled in the blanks, substantially as set forth.

In testimony whereof I affix my signature in presence of two witnesses.

TIMOTHY B. HUSSEY.

Witnesses:
 DANIEL BREED,
 WILLIAM T. HUSSEY.